United States Patent [19]

Hayden et al.

[11] Patent Number: 4,530,540
[45] Date of Patent: Jul. 23, 1985

[54] INTEGRAL TRACK VEHICLE SEAT APPARATUS

[75] Inventors: Richard Hayden, Troy; Fred F. Neumann, Rochester, both of Mich.

[73] Assignee: American Safety Equipment Corporation, Troy, Mich.

[21] Appl. No.: 534,332

[22] Filed: Sep. 21, 1983

[51] Int. Cl.³ .............................................. A47C 1/02
[52] U.S. Cl. .................................... 297/341; 248/430
[58] Field of Search ........................ 248/430, 429, 420; 297/341, 318; 296/65 R; 308/6 R, 3.8

[56] References Cited

U.S. PATENT DOCUMENTS

| | | | |
|---|---|---|---|
| 2,725,092 | 11/1955 | Cartwright | 248/430 |
| 2,780,501 | 2/1957 | Rosenberg | 248/430 |
| 3,157,441 | 11/1964 | Pickles | 308/6 R |
| 3,524,677 | 8/1970 | Louton | 248/430 |
| 3,685,872 | 8/1972 | Babbs | 248/430 |
| 3,737,197 | 6/1973 | Hall et al. | 248/429 |
| 4,062,251 | 12/1977 | Parsons | 308/6 R |
| 4,065,178 | 12/1977 | Carella et al. | 248/430 |
| 4,169,574 | 11/1979 | Garvey et al. | 296/65 R |
| 4,194,793 | 3/1980 | Offermans | 308/6 R |
| 4,204,658 | 5/1980 | Courtois | 248/430 |
| 4,262,963 | 4/1981 | Bauer et al. | 248/430 |
| 4,355,778 | 10/1982 | Hess et al. | 248/430 |
| 4,422,690 | 12/1983 | Kopich | 296/65 R |

FOREIGN PATENT DOCUMENTS

| | | | |
|---|---|---|---|
| 0905373 | 9/1962 | United Kingdom | 248/430 |
| 2107179 | 4/1983 | United Kingdom | 384/49 |

Primary Examiner—William H. Schultz
Assistant Examiner—Ramon O. Ramirez
Attorney, Agent, or Firm—Poms, Smith, Lande & Rose

[57] ABSTRACT

An integral track vehicle seat structure has a pair of laterally spaced side rails providing seat cushion mounting means, including a seat spring and seat back adjustment mechanism mounted to the side rails, a plurality of floor anchors for securing the side rails to the vehicle frame and an integral track formed integrally of the side rails and floor anchors including relatively adjustable and position lockable upper and lower track members each having an opened box section like configuration which slidably fit in internested, telescoping relation to secure the vehicle seat at all times to the vehicle floor while providing for forward and backward seat adjustment.

16 Claims, 9 Drawing Figures

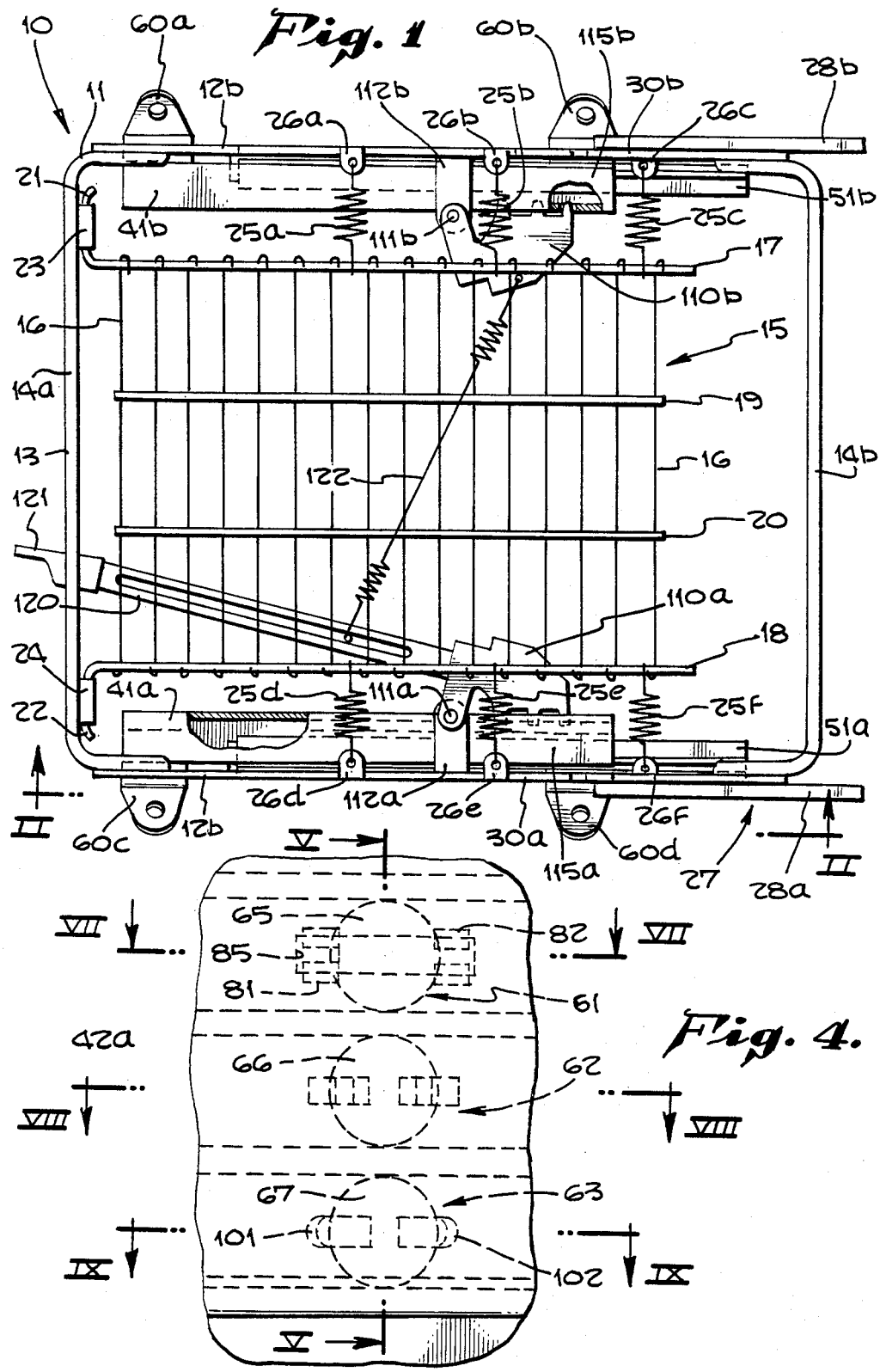

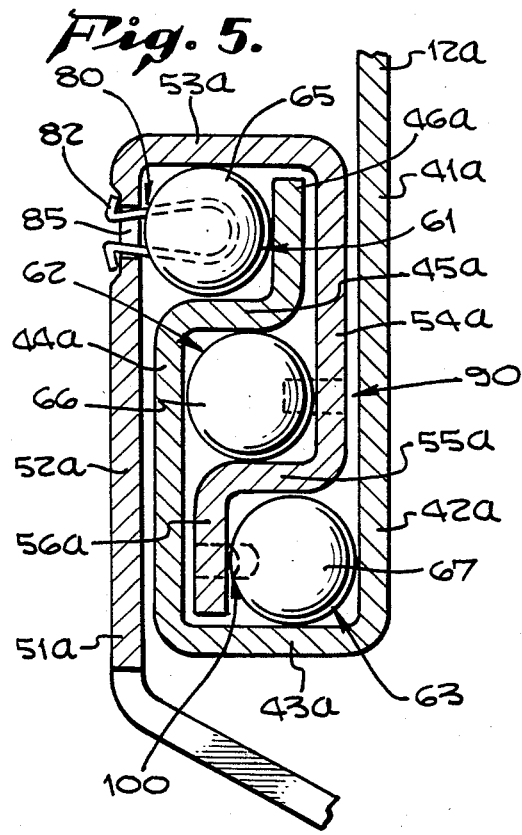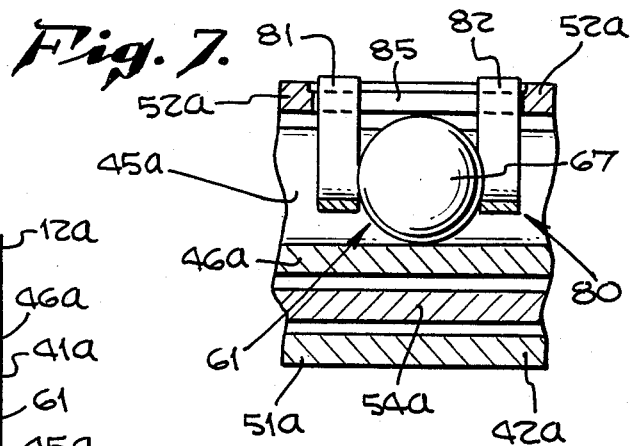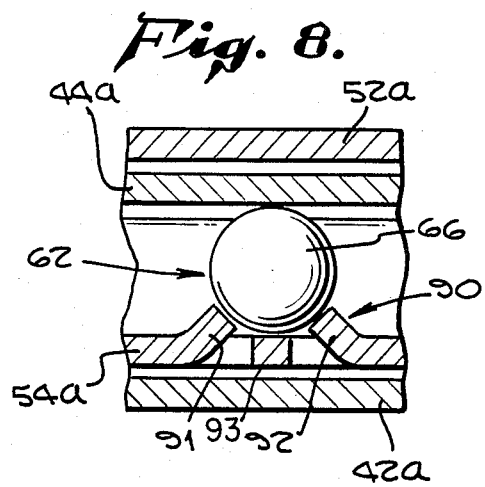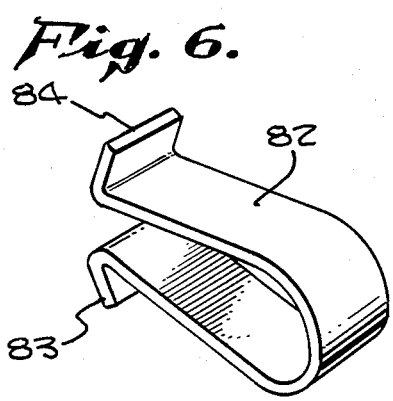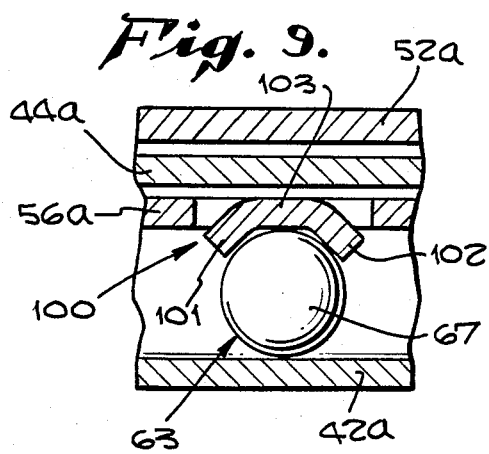

INTEGRAL TRACK VEHICLE SEAT APPARATUS

This invention relates in general to vehicle seat mounting apparatus for mounting a vehicle seat to the vehicle floor for forward and backward adjustable movement, and more particularly to a vehicle seat apparatus where the vehicle seat side rails are integral with the track mounting means secured to the floor.

BACKGROUND OF THE INVENTION

Vehicle seats, particularly automobile vehicle seats, are provided with seat and track mounting arrangements to facilitate moving the vehicle seat forward and backward to accommodate different size passengers and drivers using the vehicle. It has been common heretofore to construct a vehicle seat and mount it to floor anchors via a separately provided track arrangement. It is been recognized that the vehicle seat could be more securely held to the vehicle floor by providing an adjustable track mechanism which is integral with the seat so that the seat itself is held securely to the vehicle floor. Passenger restraint apparatus associated with the vehicle seat and/or the vehicle frame may thus be more securely held in place and, in the event of a sudden acceleration or deceleration of the vehicle, the seat will be remain in place in the vehicle as the passenger is being restrained in place in the vehicle.

It is therefore the primary object of the present invention to disclose and provide an integral track vehicle seat apparatus wherein the vehicle seat is formed integrally of the track which mounts it for forward and backward movement relative to the vehicle floor. It is a further object of the present invention to disclose and provide such an integral track vehicle seat apparatus wherein the track members are configured to provide a very positive, strong and permanent interfitted relationship while provding for ease of assembly and economy of manufacture thereof.

SUMMARY OF THE INVENTION

Generally stated, the present invention in an integral track vehicle seat apparatus comprises the provision of a pair of laterally spaced seat frame side rails having seat cushion mounting means associated therewith as well as a seat back mounting means secured to the rails so that the passenger supporting seat and back cushions are held directly to the side rails, floor anchor means for securing the seat side rails to the vehicle frame and, as particularly contemplated by the present invention, track means formed integrally of the rails and floor anchor means for providing forward and backward sliding movement of the seat rails relative to the vehicle while holding the seat frame positively to the floor anchors.

More specifically, the integral track means of the seat apparatus include interfitting box section like configured upper and lower track members in nested, relative telescoping, relation providing a plurality of ball bearing receiving raceways therebetween as well as trapping the upper and lower tracks to one another against lateral separation. Releasable pawl means are operatively disposed between the upper and lower track members to hold them in a preferred relative position of longitudinal, or telescoping movement with a manual release provided for the adjustment thereof.

More specifically, and as contemplated within the present invention, improved retaining means are provided for maintaining a plurality of ball bearings in spaced operative position relative to one another in each of the raceways with one exemplary embodiment thereof comprising retaining tabs struck out of portions of the track member, and in a second embodiment the provision of retaining clips positioned relative the track members. It is submitted that a better understanding of the present invention integral track vehicle seat apparatus, in accordance with the present invention, will be afforded to those skilled in the art, as well as a realization of additional objections and advantages thereof will be attained, by their reviewing the following detailed description of a preferred exemplary embodiment of such apparatus and three alternative embodiments of exemplary ball bearing retaining means. Reference will be made to the appended sheets of drawings which will first be briefly described.

BRIEF DESCRIPTION OF THE DRAWINGS

FIG. 1 is a plan view of a preferred exemplary embodiment of integral track adjustable seat for vehicles in accordance with the present invention.

FIG. 4 is a side detail view of a portion of the integral track of the adjustable seat of FIG. 3 taken therein along the plane IV—IV illustrating three different exemplary embodiments of ball bearing retention means suitable for in the exemplary track.

FIG. 5 is a vertical section through the integral track of FIG. 4 taken therein along the plane V—V showing the three alternative embodiments of ball bearing retention means in side elevation.

FIG. 6 is a detail view of a first exemplary embodiment of ball bearing retention means employed in the upper one of the three exemplary embodiments of retention means seen in FIGS. 4 and 5.

FIG. 7 is a section view through the integral track of FIG. 4 taken therein along the plane VII—VII showing the first exemplary embodiment of ball bearing retention means in plan, partially section, view.

FIG. 8 is a section view through the integral track of FIG. 4 taken therein along the plane VIII—VIII showing the second exemplary embodiment of ball bearing retention means in plan, partially section, view.

FIG. 9 is a section view through the integral track of FIG. 4 taken therein along the plane XI—XI showing the third exemplary embodiment of ball bearing retention means in plan, partially section, view.

DETAILED DESCRIPTION OF A PREFERRED EXEMPLARY EMBODIMENT

Figure 3:
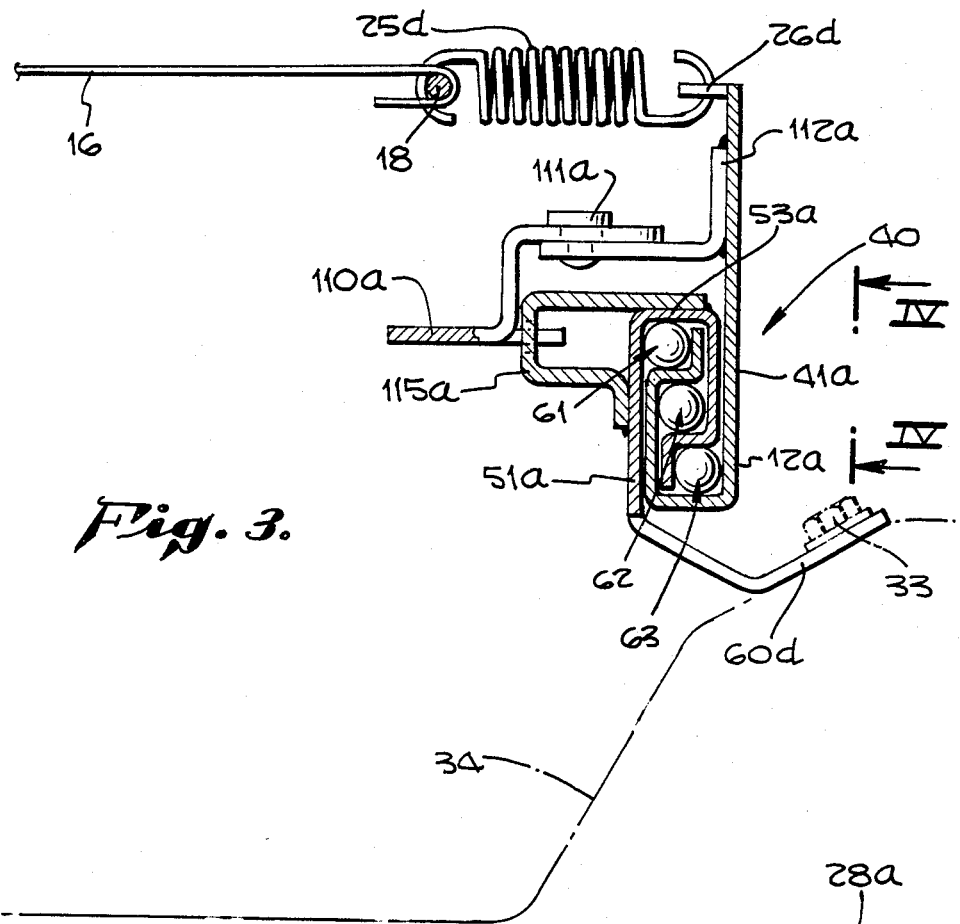
FIG. 3 is a vertical section view of the seat of FIG. 2 taken therein along the plane III—III.
Figure 2:
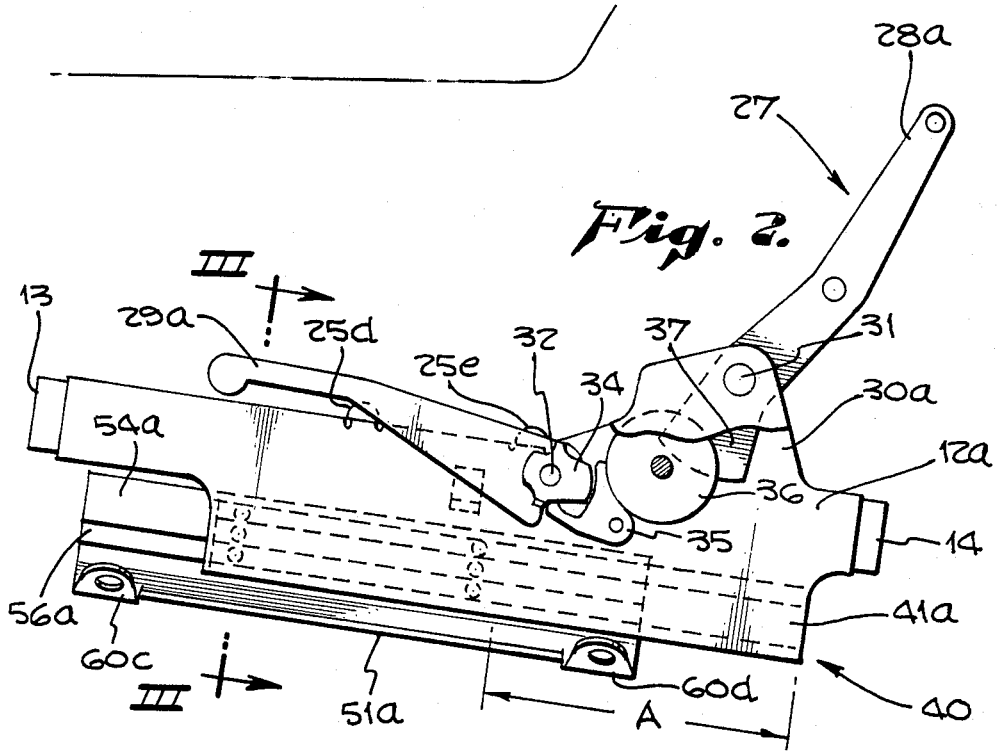
FIG. 2 is a side view of the adjustable seat of FIG. 1 taken therein along the plane II—II.

A detailed description of a preferred exemplary embodiment of integral track adjustable seat for vehicles, in accordance with the present invention, will now be presented in association initially with the illustrations of FIGS. 1, 2, and 3. As is particularly contemplated within the present invention, the seat frame, indicated generally at 10, comprises a pair of seat side rails 12a and 12b, respectively, which are mounted by integral track means, the seat left hand side being seen generally at 40 in FIG. 3, to provide forward and backward adjustment for the vehicle seat relative to the vehicle floor while securely anchoring the same to the vehicle floor as will be now described in detail.

Referring now to FIG. 1, the preferred exemplary embodiment of vehicle seat, indicated generally at 10, includes a frame 11 comprising a pair of cushion support side rails 12a and 12b together with a pair of front and rear cross bars including front cross bar 14a and rear cross bar 14b. The seat cushion springs, indicated generally at 15, comprise a plurality of cross wires 16, side arms 17 and 18, center spacer arms 19 and 20 and means for mounting the springs to the seat frame. The latter means includes the provision of end hooks 21 and 22 on arms 17 and 18, respectively, which pivotally fit within support brackets or bushings 23 and 24, respectively. The seat springs, indicated generally at 15, are thus suspended from the front cross bar 14a in pivotal manner and are supported from the side rails 12a and 12b by a plurality of suspension springs 25a-f which mount to a like plurality of eyelets 26a-f provided to the side rails. From the foregoing, it can be seen that the vehicle seat is integral of the side rails 12a and 12b.

A conventional recliner mechanism, indicated generally at 27, is provided for mounting a conventional seat back to the vehicle seat. As is typical with such mechanisms, a pair of seat back support arms 28a and 28b are provided on opposite sides of the seat frame, arm 28a being best seen in FIG. 2, with an adjustment lever 29a provided on one side of the seat for releasably holding the levers 28a and 28b in desired positions of inclination relative to the seat. Seat back support arms 28a and 28b are preferably mounted to side mounting plates 30a and 30b formed integrally of the seat side rails 12a and 12b by appropriate pivot means including the pivot pin 31 seen in FIG. 2. The adjustment lever arm 29a may be pivoted by a pivot pin 32 to the support plate 12a in FIG. 2 as well. Cam member 34, operated by arm 29a, engages and moves pawl 35 into locking tooth upon tooth engagement with idler member 36 which in turn engages mating teeth on a lower end 37 of the seat arm 28a. Idler member 36 may have a smaller diameter of teeth on a rear portion thereof to engage mating teeth on the lower end 37 of arm 28a to give a mechanical advantage to the engagement between pawl 35 and the larger diameter tooth forward portion of idler 36 when the arm 29a is in the seat back locking position of FIG. 2.

Referring now to FIGS. 2 and 3, and is particularly contemplated within the present invention, track means are formed integrally of the side rails 12a and 12b for adjustably mounting the seat relative to floor anchors, which may include conventional bolts 33 passing through the plurality of seat frame anchor flanges 60a-d. The integral track means, indicated generally at 40, in the exemplary embodiment includes an upper track member including left hand upper track 41a and right hand upper track 41b, and a pair of lower track members including left hand track member 51a and right hand track member 51b (as seen in FIG. 1). Anchor flanges 60a-d are integral with the lower track members 51a and 51b, as best seen with regard to track member 51a and anchor 60d as seen in FIG. 3. As is also particularly contemplated within the present invention, the upper and lower track members 41a, 41b and 51a, 51b are provided in an open box section configuration in internested sliding fit relation providing a plurality of longitudinally extending bearing raceways therebetween as seen in FIGS. 2 and 3. Referring to the enlarged detail view of FIG. 5, each of the upper track members, the upper track member 41a being illustrated, has an upperly opening box section configuration including a back wall, as wall 42a, a bottom wall, as wall 43a, a front wall, as wall 44a, a top wall, as wall 45a, which completes the box like configuration but ends in spaced relation from the back wall, as wall 42a in FIG. 5, with the top wall merging into an upstanding vertical wall, as wall 46a in FIG. 5, which is spaced laterally from the back wall, as wall 42a in FIG. 5.

Each of the lower tracks 51a and 51b include a similarly configured, but downwardly opening box section configuration including a back wall, as wall 52a in FIG. 5, a top wall as wall 53a, a depending front wall, as wall 54a, a reversely bent bottom wall, as wall 55a, which terminates prior to reaching the back wall in a vertically depending wall, as wall 56a in FIG. 5. As can be seen from the foregoing, and the illustrations thereof in FIGS. 2, 3 and 5, the upper and lower track members slide together in telescoping, interfitting relation providing three ball bearing receiving raceways indicated generally at 61, 62 and 63. A plurality of ball bearings, such as bearings 65, 66 and 67 in FIG. 5, are retained in each of the raceways by bearing retaining means which will subsequently be described.

Means are provided for retaining ball bearings in spaced operative relation within the raceways 61, 62 and 63 respectively to facilitate the sliding movement of the telescoping, interfitting integral track means of the present invention. Three exemplary embodiments of retaining means are illustrated in FIGS. 5 through 9 as will now be described. It should be understood by those skilled in the art that any individual exemplary embodiment of retaining means may be employed in each of the raceways, it being convenient for illustrative purposes here to show a different exemplary embodiment in each of the three raceways, although in practice it is assumed that a particular integral track means in accordance with the present invention would employ the same type of retaining means in each of the raceways.

Referring now to FIGS. 5, 6 and 7, a first exemplary embodiment of retaining means is illustrated generally at 80. In the first exemplary embodiment of ball bearing retaining means, indicated generally 80, a pair of retaining clips 81 and 82 is provided with each of the clips, as best seen in FIG. 6, including a generally U-shaped spring body 82 having reversely bent outwardly extending clip feet 83 and 84 to facilitate snapping the clips through apertures in the track member, as aperture 85 in track 51a back wall, 52a as seen in FIGS. 5 and 7. The clips are positioned on either side of the associated ball bearing, as ball bearing 65 as seen in FIG. 7. The clips may be held in place by as suitable retainer extending between them on the outer side of wall 52a or may stay in the desired location due to the width of the clip and the tightness of the engagement between the clip and the apertures through which it protrudes.

A second exemplary embodiment of retainer means for retaining the ball bearings in the raceway is illustrated generally at 90 in association with raceway 62. As perhaps best seen in FIG. 8, the exemplary retainer means indicated generally at 90, comprises the provision of a pair of opposed ball retaining tabs 91 and 92 struck out of portions of the wall 54a of the track members adjacent the balls, as ball 66 in FIG. 8. A midsection or web 93 may be left between the spaced struck up tabs 91 and 92 to give a three point contact along wall 54a with the upper track member wall 44a abutting an opposite side of the ball bearing.

A third exemplary embodiment of ball bearing retention means is indicated generally at 100 in FIGS. 5 and 9 and is illustrated in association with one of the balls 67 in FIG. 9. as can be seen in FIG. 9, a pair of oppositely directed ball retention tabs 101 and 102 are struck out of the track member wall leaving a center web 103. Ball 67 is thus trapped between the tabs 101 and 102, web 103 and the opposite wall 42a of the upper track member.

As should now be apparent to those skilled in the art, the integral track means, indicated generally at 40 in the exemplary embodiment, provides an integral mounting of the vehicle seat to the floor anchors with a forward and backward sliding movement provided by the upper and lower track members 41a, 41b formed integrally of the seat side rails 12a and 12b and the lower track members 51a, 51b formed integrally of the floor anchor tabs 60a-d.

The forward and backward adjustment of the integral seat track, represented by the letter A in FIG. 2, in selectable positions of adjustment is accomplished through the provision of the seat locating means including locating pawls 110a and 110b (as best seen in FIG. 1) pivotally mounted by pivots 111a and 111b, respectively, to mounting flanges 112a and 112b extending from the side rails 12a and 12b, respectively. The brackets 112a and 112b may be mounted, as by welding, to the respective seat side rails, as seen in relation to bracket 112a being mounted to rail 12a in FIG. 3, to position each of the pawls for engaging ratchet members 115a and 115b (as seen in FIGS. 1 and 3) via a plurality of pawl teeth on each of the pawls which engage in a like plurality of ratchet openings in the ratchet members 115a and 115b to securely locate the forward and backward positioning of the upper rails 41a, 41b relative to the lower rails 51a, 51b. As best seen in FIG. 3, the ratchet members, as member 115a, may be welded to the lower rail member, as member 51a in FIG. 3. Release of the seat adjustment pawls 110a and 110b may be acomplished through the provision of the manually operated lever 120 (as seen in FIG. 1) via its handle 121 which extends forwardly of the seat. Lever 120 is connected directly to seat adjustment pawl 110a and is connected by a spring arm 122 to the opposite pawl 110b as seen in FIG. 1. The vehicle seat is thus adjustable forwardly and backwardly with the upper and lower track members being maintained in their internested or interfitting relationship via their telescoping box section configuration, as best seen in FIG. 5, to always maintain the seat securely to the vehicle.

Having thus described a preferred exemplary embodiment of integral track vehicle seat apparatus in accordance with the present invention, it should be understood by those skilled in the art that various adaptations, modifications and alternative embodiments may be made thereof within the scope and spirit of the present invention which is defined by the following claims.

We claim:

1. An integral track vehicle seat apparatus having: a pair of laterally spaced side rails; seat cushion mounting means secured to said rails for mounting a passenger receiving seat thereto; seat back mounting means secured to said rails for mounting a passenger supportive seat back thereto; floor anchor means for securing the seat side rails to a vehicle; and track means formed integrally of said rails and floor anchor means for providing forward and backward sliding movement of said seat relative to said vehicle, the improvement in said track means comprising:

upper and lower track members, each having a pair of spaced vertical front and back walls and a pair of spaced horizontal top and bottom walls, a first one of said top and bottom walls extending between said front and back walls and a second one of said top and bottom walls extending between said front and back walls, but ending in spaced relation to one of them to provide each of said members with portions of open box section configuration, said members being in internested sliding fit relation whereby said portions, including said walls provide a plurality of longitudinally extending bearing raceways within said box section configurations.

2. An integral track vehicle seat apparatus having: a pair of laterally spaced side rails; seat cushion mounting means secured to said rails for mounting a passenger receiving seat thereto; seat back mounting means secured to said rails for mounting a passenger supportive seat back thereto; floor anchor means for securing the seat side rails to a vehicle; and track means formed integrally of said rails and floor anchor means for providing forward and backward sliding movement of said seat relative to said vehicle, the improvement in said track means comprising:

upper and lower track members, wherein: said upper and lower track members each have portions providing a back wall, bottom wall, front wall and top wall of shorter length than said bottom wall to form an open box section, said members portions being in internested sliding fit relation with said walls providing a plurality of longitudinally extending bearing raceways within said internested portions.

3. The integral track vehicle seat apparatus of claim 2 wherein:

a plurality of ball bearings are provided in each of said raceways and means are provided on said track members for maintaining a plurality of said ball bearings in a given raceway in spaced operative position relative to one another.

4. The integral track vehicle seat apparatus of claim 3 wherein:

said maintaining means comprise the provision of ball retaining tabs struck out of portions of the walls of said track members adjacent said balls.

5. The integral track vehicle seat apparatus of claim 4 wherein said tabs are provided in outwardly struck pairs of tabs for retaining an individual ball bearing relative thereto.

6. The integral track vehicle seat apparatus of claim 4 wherein said tabs are provided in pairs of inwardly facing tabs for maintaining a ball bearing relative thereto.

7. The integral track vehicle seat apparatus of claim 4 wherein:

said maintaining means comprise the provision of ball retaining clips positioned on opposite sides of each ball bearing in the respectively raceway, said clips being mounted through openings provided in the adjacent walls of said track members.

8. The integral track vehicle seat apparatus of claim 7 wherein:

said openings in said walls of said track members are all in the walls of one of said track members.

9. An integral track vehicle seat apparatus having a pair of seat frame side rails and means for mounting a vehicle seat thereto; floor anchor means for securing the seat apparatus to a vehicle floor; and track means formed integrally of said rails and anchor means for providing forward and backward movement of said seat selective to said vehicle, the improvement in said track means comprising:

upper and lower track members wherein said upper and lower track members each have portions providing a back wall, bottom wall, front wall and top wall of shorter length than said bottom wall to form an open box section with a vertical wall extending from said top wall generally parallel to said back wall, said members portions being in internested sliding fit relations with said walls providing a plurality of longitudinally extending bearing raceways within said internested portions.

10. The integral track vehicle seat apparatus of claim 9 wherein:

a plurality of ball bearings are provided in each of said raceways and means are provided on said track members for maintaining a plurality of ball bearings in a given raceway in spaced operative position relative to one another.

11. The integral track vehicle seat apparatus of claim 10 wherein:

said maintaining means are provided on each of said back, front and vertical walls of said lower track members to provide said maintaining means in each of three raceways provided between said upper and lower track members.

12. The integral track vehicle seat apparatus of claim 10 wherein:

said maintaining means comprise the provision of ball retaining tabs struck out of portions of the walls of said track members adjacent said balls.

13. The integral track vehicle seat apparatus of claim 12 wherein said tabs are provided in outwardly struck pairs of tabs for retaining an individual ball bearing relative thereto.

14. The integral track vehicle seat apparatus of claim 12 wherein said tabs are provided in pairs of inwardly facing tabs for maintaining a ball bearing relative thereto.

15. The integral track vehicle seat apparatus of claim 12 wherein:

said maintaining means comprise the provision of ball retaining clips positioned on opposite sides of each ball bearing in the respectively raceways, said clips being mounted through openings provided in the adjacent walls of said track members.

16. The integral track vehicle seat apparatus of claim 15 wherein:

said openings in said walls of said track members are all in the walls of one of said track members.

* * * * *